Figure 1:
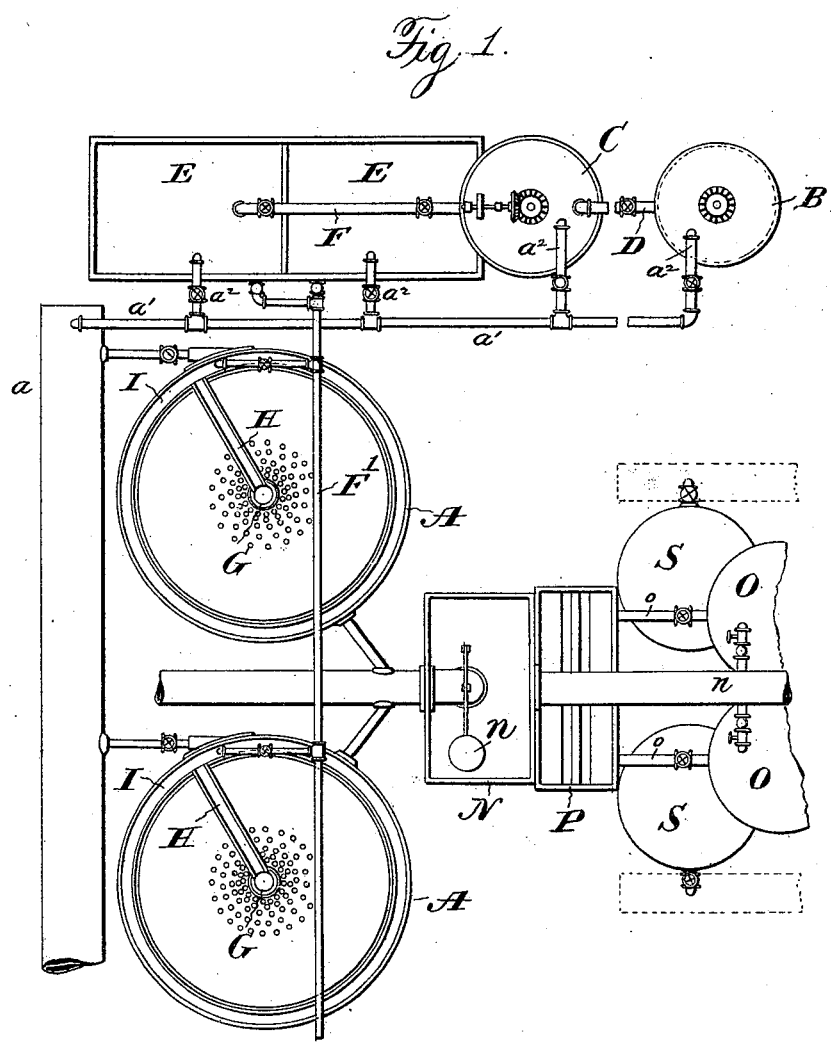

No. 646,387. Patented Mar. 27, 1900.
J. MacDOUGALL.
PROCESS OF PURIFYING WATER.
(Application filed Mar. 7, 1900.)
(No Model.) 2 Sheets—Sheet 1.

Witnesses:
Jas. E. Hutchinson
J. T. Beiss

Inventor.
John MacDougall,
by Chas. J. Williamson, his Atty

No. 646,387. Patented Mar. 27, 1900.
J. MacDOUGALL.
PROCESS OF PURIFYING WATER.
(Application filed Mar. 7, 1900.)
(No Model.) 2 Sheets—Sheet 2.
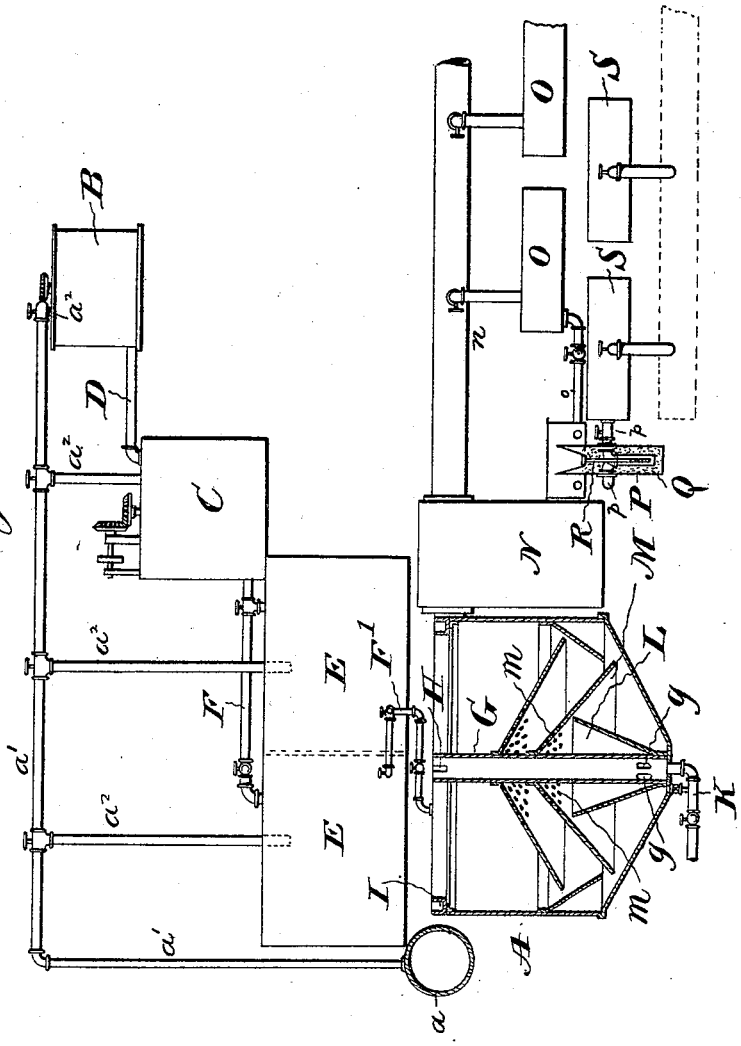

UNITED STATES PATENT OFFICE.

JOHN MacDOUGALL, OF DETROIT, MICHIGAN.

PROCESS OF PURIFYING WATER.

SPECIFICATION forming part of Letters Patent No. 646,387, dated March 27, 1900.

Application filed March 7, 1900. Serial No. 7,618. (No specimens.)

*To all whom it may concern:*

Be it known that I, JOHN MACDOUGALL, of Detroit, in the county of Wayne, and in the State of Michigan, have invented certain new and useful Improvements in Processes of Purifying Water; and I do hereby declare that the following is a full, clear, and exact description thereof, reference being had to the accompanying drawings, in which—

Figure 1 is a top plan view of a plant designed for the practice of my process, and Fig. 2 a side elevation thereof with parts in section.

Letters of like name and kind refer to like parts in each of the figures.

The object of my invention is to provide a process for the purification of water by which a maximum of purity thereof shall be obtained, its treatment be rapid, and at a minimum cost in respect to labor and the materials used in its treatment; and to this end said invention consists in the process substantially as hereinafter specified and claimed.

This process involves the purification of water by causing the agglomeration of matters therein by subjecting the water to the action of an excess of lime over that necessary for the neutralization of any carbonates present, the excess used being in the proportion stated hereinafter.

In the practice of my process with the apparatus illustrated the water to be treated is conducted from its source by means of a main $a$ to one or more tanks A and A, into which is introduced lime in the form of hydrate or milk of lime. Preferably hydrate of lime is used, and for its production there is employed in connection with each tank A a tank B for slaking caustic lime and mixing it with water, a tank C, connected by a pipe D with the tank B, for diluting the mixture from the latter to form milk of lime, and a tank or tanks E and E, to which the milk of lime is conveyed by a pipe F and which are supplied with water, so that the hydrate is formed therein, the water and milk of lime being in such proportions as to produce a completely-saturated solution. Such water as is needed for the tanks B, C, E, and E is taken from the main $a$ by means of a pipe $a'$ and valved branches $a^2$ and $a^3$ thereof, which branches lead, respectively, to said tanks. The hydrate from the tanks E and E is conveyed to the lime-treating tanks A and A by suitably-valved piping F'. There are preferably two tanks E and E for the lime-treatment tanks A and A, so that while the solution is being drawn off from one it can be in course of preparation in the other, and thus a constant supply of the hydrate provided.

The lime-treatment tanks A and A have each preferably a cylindrical upper portion and a conical lower portion, and within each, at the center thereof, is a vertical pipe G, that at its upper end is connected by a radial channel H with a circular channel I at the top of the tank, into which the water to be treated and the hydrate are introduced and flowing around the same are conveyed into the pipe G through the channel H, the lime and water being thoroughly commingled in the channels. At or near its lower end the pipe G has a number of outlet-holes $g$ and $g$ in its side leading into the tank at or near the bottom, and it communicates at its lower end with a pipe K for the purpose of discharging the sediment, said pipe being controlled by suitable valves.

Around the lower portion of the pipe G is an inverted hollow cone L, and above the latter is a hollow cone M, whose lower end is below the upper end of the inverted cone L. The upper portion of the cone M has numerous small perforations $m$ and $m$. One or more cones similar to the cone M may be employed. By means of the inverted cone L the lime-treated water coming from the pipe G is directed up into the cone M, and by the latter a large volume is deflected and caused to descend and move laterally. On emerging from the cone at rim or edge it passes upward. By reason of the small perforations $m$ and $m$ small streams or currents pass through the upper part of the cone, and thus prevent the presence of a stagnant or quiescent body of water within the same which would otherwise exist. The entire body of water is thus kept in motion.

I introduce lime into the water under treatment in a quantity that is determined by the amount of bicarbonates present and the amount of other matters in suspension and in solution, which quantity must be in excess of that which will neutralize any bicarbonates present. I have found that by the presence of such excess there is effected the removal of impurities in the water to a degree hitherto not attained, the lime acting to break up the organic matters in solution and to agglomerate into molecular aggregates the resultants and the particles of clay and other mineral matters and humus in suspension, which by thus flocculating cause and hasten their precipitation. The materials thus affected are ordinarily hydrous-aluminum-silicate, kaolinite, and other colloids or hydrogels whose absorptive powers are similar to those of clay. In their precipitation these agglomerated materials involve and carry down with them the bacteria and other matter in suspension.

The proportion of excess of lime which I have found to produce the best results is from two to six grains to a gallon of the water being treated, the production of the above-described peculiar effect upon the matters in the water by the presence of the lime being the important and vital thing. The proper quantity of lime to be used in any case is determinable by ascertaining what quantity will best and most completely produce such effect, and the quantity used may in some cases extend to an excess of ten grains to a gallon of the water.

The cone M, offering an obstacle to the flow of the water, arrests the matters in suspension, and thus facilitates and expedites their agglomeration by the above-described action of the lime and their precipitation.

I am aware that it is not new to introduce lime in the form of a hydrate or milk of lime into water containing bicarbonate of lime to neutralize the latter, and while this results from my treatment it is incidental, since in treating such water my special object is to attain results by the presence of an excess of lime over and above that required to form the carbonate.

No stoppage of the water in the lime-treatment tanks is necessary for sedimentation, as I have found that by my treatment the removal of impurities to the desired degree can be effected with the water constantly in motion, it being continuously supplied at the inlet and continuously discharged.

The rate of flow of water through the lime-treatment tank is regulated according to the quantity of matter in suspension and the quantity of impurities in solution.

From the lime-treatment tank the water is carried to an equalizing-tank N, into which its flow is automatically controlled, as by a float-valve $n$, to produce a constant or uniform pressure or head on the water as delivered to the filters to insure a proper and regular supply thereto. From said tank a main $n$ conducts the water to the first filters O and O, which by straining clarify it by the removal of suspended matters, bacteria, &c., which have not been previously eliminated. The great proportion of such matters is removed by precipitation in the lime-treatment tank, but a small percentage remains, which makes it desirable to employ the filters O and O. For the purpose of removing the lime still present in the water the latter is next, preferably, treated with carbonic-acid gas to form carbonate of lime, although some other reagent, such as soda-ash, may be used. For treatment with carbonic-acid gas the water is passed through a carbonator, comprising a carbonating-tank P, filled with coke Q, and into which by numerous pipes R and R the gas from a suitable source is delivered, the coke being used to insure the thorough mixture of gas with the water for combination with the lime contained therein to change it into a carbonate. Pipes $o$ and $o$ conduct the water from the filters O and O to the carbonator.

Inasmuch as the action of caustic lime on organic matters in water is to break them up, it follows that this desirable effect is continued after the water leaves the lime-treatment tank and up to the time it reaches the carbonator, in view of the fact that there is such lime present. I therefore secure an advantage over the practice when in the treatment of water containing bicarbonate of lime only enough lime is used to produce the neutralization of the bicarbonates, as in such case no beneficial action of the lime can be obtained on organic matters present in the solution.

The final step in the treatment is to pass the water from the carbonator to second filters S and S to effect the removal of any hitherto unremoved matters, such as carbonates, bacteria, &c. Pipes $p$ and $p$ conduct the water from the carbonator P to the second filters.

It is to be understood that the illustration and description herein of apparatus by which my process can be practiced are not to be regarded as restricting the scope of the invention, as the latter being a process is not dependent for its practice upon the employment of any special form of apparatus; nor is it to be understood that the scope of the invention is restricted to the use of all of the steps or stages of treatment herein set forth, as some may be omitted or varied, according to the demands or requirements of particular cases.

Having thus described my invention, what I claim is—

1. The process of purifying water which consists in passing it into a suitable tank or receptacle, causing the agglomeration of matters in the water by subjecting the water, while in such tank or receptacle, to the action of an excess of lime over that necessary for the neutralizing of any carbonates present, the excess being in a proportion not greater than ten grains to a gallon of the water treated, and then removing the agglomerates, substantially as described.

2. The process of purifying water which consists in causing the agglomeration of matters therein by subjecting the water to the action of an excess of lime over that necessary for the neutralizing of any carbonates present, the excess being in a proportion not greater than ten grains to a gallon of the water treated, and then separating the agglomerates and the water, substantially as described.

3. The process of purifying water which consists in causing the agglomeration of matters therein by subjecting the water to the action of an excess of lime over that necessary for the neutralizing of any carbonates present, the excess being in a proportion not greater than ten grains to a gallon of the water treated, separating the agglomerates and the water, and then removing the lime still present, substantially as described.

4. The process of purifying water which consists in causing the agglomeration of matters therein by subjecting the water to the action of an excess of lime over that necessary for the neutralizing of any carbonates present, the excess being in a proportion not greater than ten grains to a gallon of the water treated, separating the agglomerates and the water, and then subjecting the water to the action of carbonic-acid gas, substantially as described.

5. The process of purifying water which consists in causing the agglomeration of matters therein by subjecting the water to the action of an excess of lime over that necessary for the neutralizing of any carbonates present, the excess being in a proportion not greater than ten grains to a gallon of the water treated, filtering the water, and then suitably treating it to remove the lime still present, substantially as described.

6. The process of purifying water which consists in causing the agglomeration of matters therein by subjecting the water to the action of an excess of lime over that necessary for the neutralizing of any carbonates present, the excess being in a proportion not greater than ten grains to a gallon of the water treated, filtering the water, suitably treating it to form the lime still present into an insoluble compound, and then filtering it again, substantially as described.

In testimony that I claim the foregoing I have hereunto set my hand this 7th day of March, 1900.

JOHN MacDOUGALL.

Witnesses:
J. P. BLISS,
CHAS. J. WILLIAMSON.